US012620243B2

(12) United States Patent
Yamagami et al.

(10) Patent No.: US 12,620,243 B2
(45) Date of Patent: May 5, 2026

(54) INFORMATION TERMINAL, CHARACTER RECOGNITION METHOD AND CHARACTER RECOGNITION PROGRAM

(71) Applicant: DAIKIN INDUSTRIES, LTD., Osaka (JP)

(72) Inventors: Satoshi Yamagami, Osaka (JP); So Yanagimoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 19/065,153

(22) Filed: Feb. 27, 2025

(65) Prior Publication Data

US 2025/0201000 A1    Jun. 19, 2025

Related U.S. Application Data

(63) Continuation of application No. PCT/JP2023/030468, filed on Aug. 24, 2023.

(30) Foreign Application Priority Data

Sep. 5, 2022    (JP) ................................. 2022-140707

(51) Int. Cl.
*G06V 20/62* (2022.01)
*G06V 30/19* (2022.01)
(52) U.S. Cl.
CPC .......... *G06V 20/63* (2022.01); *G06V 30/1916* (2022.01)
(58) Field of Classification Search
CPC .... G06K 7/1447; G06K 7/1095; G06V 30/10; G06V 20/62; G06V 20/63; G06V 30/1916
See application file for complete search history.

(56) References Cited

U.S. PATENT DOCUMENTS 7,903,875 B2 * 3/2011 Fujita ................... G06V 30/142
                                                  382/175
9,058,536 B1 * 6/2015 Yuan .................... G06V 30/262
                 (Continued)

FOREIGN PATENT DOCUMENTS

CN        104106078 A  * 10/2014 .......... G06V 30/133
CN        110059686        7/2019
                 (Continued)

OTHER PUBLICATIONS

International Search Report for PCT/JP2023/030468 mailed on Sep. 26, 2023.

(Continued)

*Primary Examiner* — Dung Hong
(74) *Attorney, Agent, or Firm* — IPUSA, PLLC

(57) ABSTRACT

An information terminal includes a controller. The controller is configured to: repeat a process of acquiring a frame image that has been captured and a process of storing a character recognition result in a storage, the character recognition result being obtained by performing character recognition of the frame image and being a character string that is determined to be written in accordance with a naming rule; and when a predetermined operation to the information terminal to end capturing of the frame image is received and the character recognition result is not stored in the storage based on a frame image acquired when the predetermined operation is received, finalize the character recognition result to be the character string that is stored in the storage based on a frame image acquired prior to the frame image when the predetermined operation is received.

11 Claims, 13 Drawing Sheets

(56)                  References Cited

U.S. PATENT DOCUMENTS

| | | | |
|---|---|---|---|
| 2004/0252219 A1 | 12/2004 | Seki | |
| 2012/0257832 A1 | 10/2012 | Kobayashi et al. | |
| 2013/0347050 A1* | 12/2013 | Friel | G06F 18/22 |
| | | | 725/133 |
| 2014/0355076 A1 | 12/2014 | Shibutani et al. | |
| 2017/0024626 A1 | 1/2017 | Inaba | |
| 2017/0116494 A1* | 4/2017 | Isaev | G06V 20/46 |
| 2018/0025222 A1* | 1/2018 | Yellapragada | G06V 30/416 |
| | | | 382/176 |

FOREIGN PATENT DOCUMENTS

| | | | | | |
|---|---|---|---|---|---|
| CN | 113727215 A | * | 11/2021 | ............ | G06F 16/58 |
| JP | 2000-207487 | | 7/2000 | | |
| JP | 2000207487 A | * | 7/2000 | | |
| JP | 2001-008072 | | 1/2001 | | |
| JP | 2003216893 A | * | 7/2003 | | |
| JP | 2004-199514 | | 7/2004 | | |
| JP | 2004206548 A | * | 7/2004 | | |
| JP | 2005018507 A | * | 1/2005 | | |
| JP | 2012-221095 | | 11/2012 | | |
| JP | 2013-161277 | | 8/2013 | | |
| JP | 2013-190952 | | 9/2013 | | |
| JP | 2016-119059 | | 6/2016 | | |
| JP | 2017-016549 | | 1/2017 | | |
| JP | 2017016549 A | * | 1/2017 | | |
| JP | 2017091514 A | * | 5/2017 | | |
| JP | 2017204251 A | * | 11/2017 | ............ | G05B 23/02 |
| JP | 2020-086922 | | 6/2020 | | |
| JP | 2020-091748 | | 6/2020 | | |
| JP | 2020086922 A | * | 6/2020 | | |

OTHER PUBLICATIONS

International Preliminary Report on Patentability for PCT/JP2023/030468 mailed on Mar. 20, 2025.

Petrova Olga et al: "Methods of weighted combination for text field recognition in a video stream", SPIE Proceedings; [Proceedings of SPIE ISSN 0277-786X], SPIE, US, vol. 11433, Jan. 31, 2020 (Jan. 31, 2020), pp. 114332L-114332L, XP060128229, DOI: 10.1117/122559378, ISBN: 978-1-5106-3673-6.

Extended European search report mailed on Sep. 26, 2025 with respect to the corresponding EP patent application No. 23862950.5

* cited by examiner

FIG.1
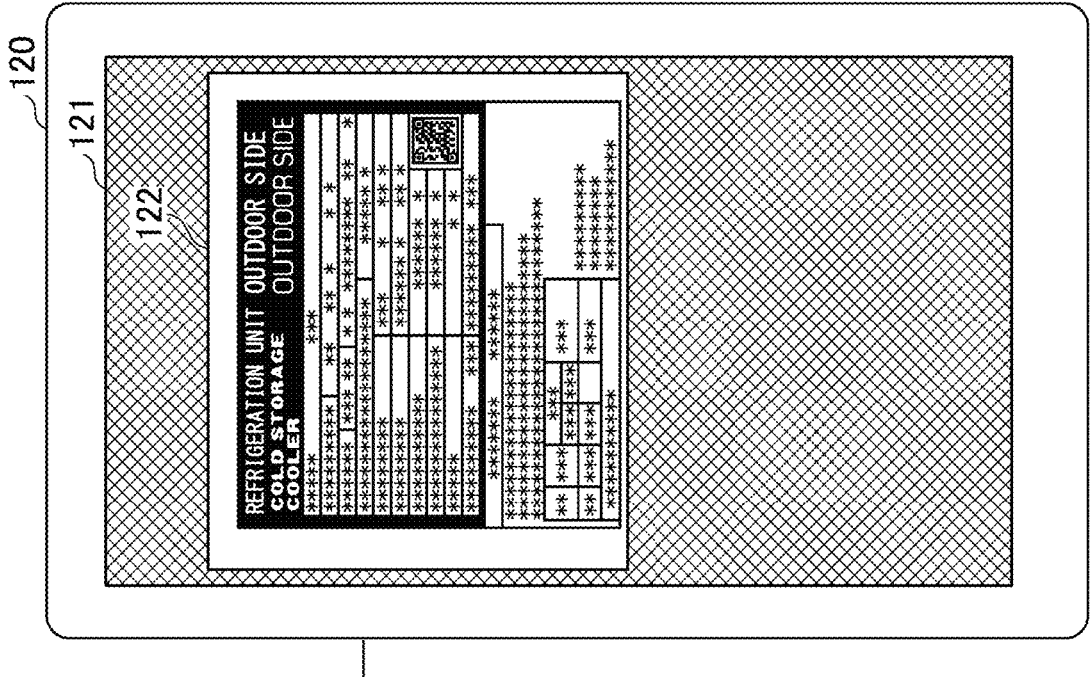
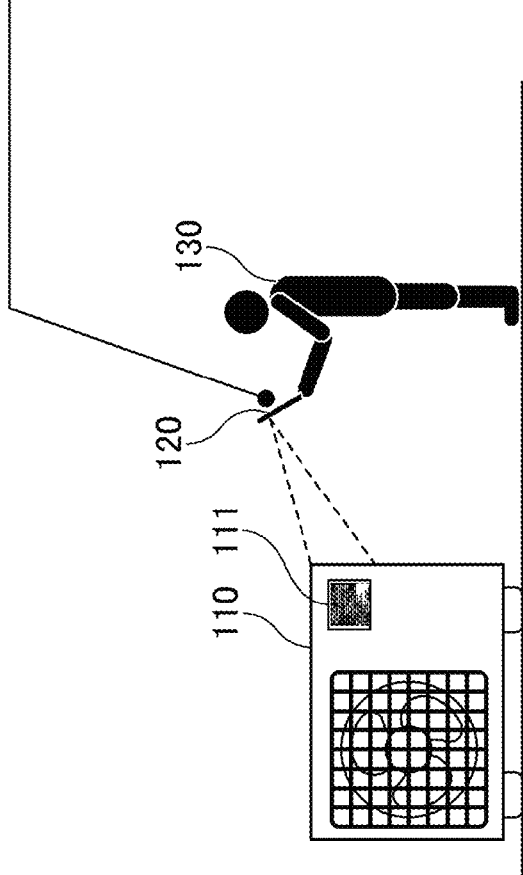

FIG.5

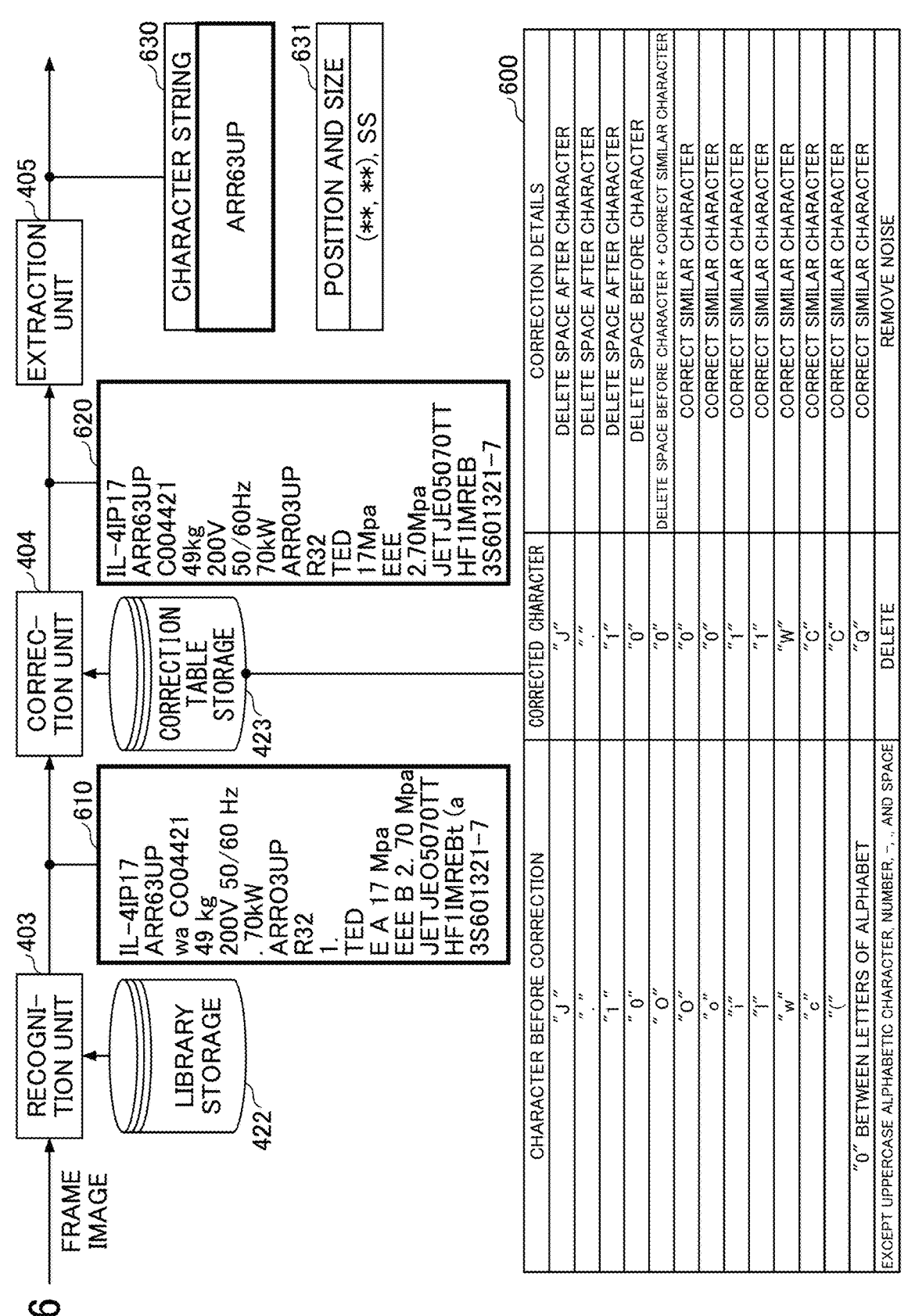

FIG.6

| CHARACTER BEFORE CORRECTION | CORRECTED CHARACTER | CORRECTION DETAILS |
|---|---|---|
| "J" | "J" | DELETE SPACE AFTER CHARACTER |
| "." | "," | DELETE SPACE AFTER CHARACTER |
| "1" | "1" | DELETE SPACE AFTER CHARACTER |
| "0" | "0" | DELETE SPACE BEFORE CHARACTER |
| "O" | "O" | DELETE SPACE BEFORE CHARACTER + CORRECT SIMILAR CHARACTER |
| "o" | "o" | CORRECT SIMILAR CHARACTER |
| "o" | "0" | CORRECT SIMILAR CHARACTER |
| "i" | "1" | CORRECT SIMILAR CHARACTER |
| "1" | "1" | CORRECT SIMILAR CHARACTER |
| "w" | "W" | CORRECT SIMILAR CHARACTER |
| "c" | "C" | CORRECT SIMILAR CHARACTER |
| "c" | "C" | CORRECT SIMILAR CHARACTER |
| | "O" | CORRECT SIMILAR CHARACTER |
| | DELETE | REMOVE NOISE |
| "0" BETWEEN LETTERS OF ALPHABET | | |
| EXCEPT UPPERCASE ALPHABETIC CHARACTER, NUMBER, –, ., AND SPACE | | |

600

INFORMATION TERMINAL, CHARACTER RECOGNITION METHOD AND CHARACTER RECOGNITION PROGRAM

CROSS-REFERENCE TO RELATED APPLICATIONS

This application is a continuation application of International Application No. PCT/JP2023/030468 filed on Aug. 24, 2023 and designated the U.S., which is based upon and claims priority to Japanese Patent Application No. 2022-140707, filed on Sep. 5, 2022, the entire contents of which are incorporated herein by reference.

TECHNICAL FIELD

The present disclosure relates to an information terminal, a character recognition method, and a character recognition program.

BACKGROUND ART

There is a known technology that acquires equipment data of on-site equipment by image capturing, by using an information terminal, equipment nameplates attached to various on-site equipment such as air conditioning equipment and performing a character recognition process. According to this technology, for example, a maintenance worker can manage the equipment data of on-site equipment that has been inspected on site only by capturing images of the equipment nameplates.

PRIOR ART DOCUMENTS

Patent Documents

Patent Document 1: Japanese Laid-Open Patent Publication No. 2020-091748

On the other hand, in the case of image capturing on site, depending on image capturing conditions, the character recognition process is not performed properly and misrecognition occurs, and the situation may occur that the correct equipment data cannot be acquired for part or all of the equipment data. In such a case, the maintenance worker has to redo the image capturing, and a workload for the maintenance worker is high.

SUMMARY

The present disclosure reduces a workload of an operator when acquiring equipment data of on-site equipment by image capturing.

An aspect of the present disclosure is an information terminal including:

a controller, wherein the controller is configured to:

repeat a process of acquiring a frame image that has been captured and a process of storing a character recognition result in a storage, the character recognition result being obtained by performing character recognition of the frame image and being a character string that is determined to be written in accordance with a naming rule; and when a predetermined operation to the information terminal to end capturing of the frame image is received and the character recognition result is not stored in the storage based on a frame image acquired when the predetermined operation is received, finalize the character recognition result to be the character string that is stored in the storage based on a frame image acquired prior to the frame image when the predetermined operation is received.

BRIEF DESCRIPTION OF THE DRAWINGS

FIG. 1 is a diagram illustrating an application example of an information terminal.

FIG. 5 is a diagram illustrating an operation example of the entire information terminal.

FIG. 6 is a diagram illustrating a specific example of processing from a recognition unit to a extraction unit.

DESCRIPTION OF EMBODIMENTS

Figure 2:
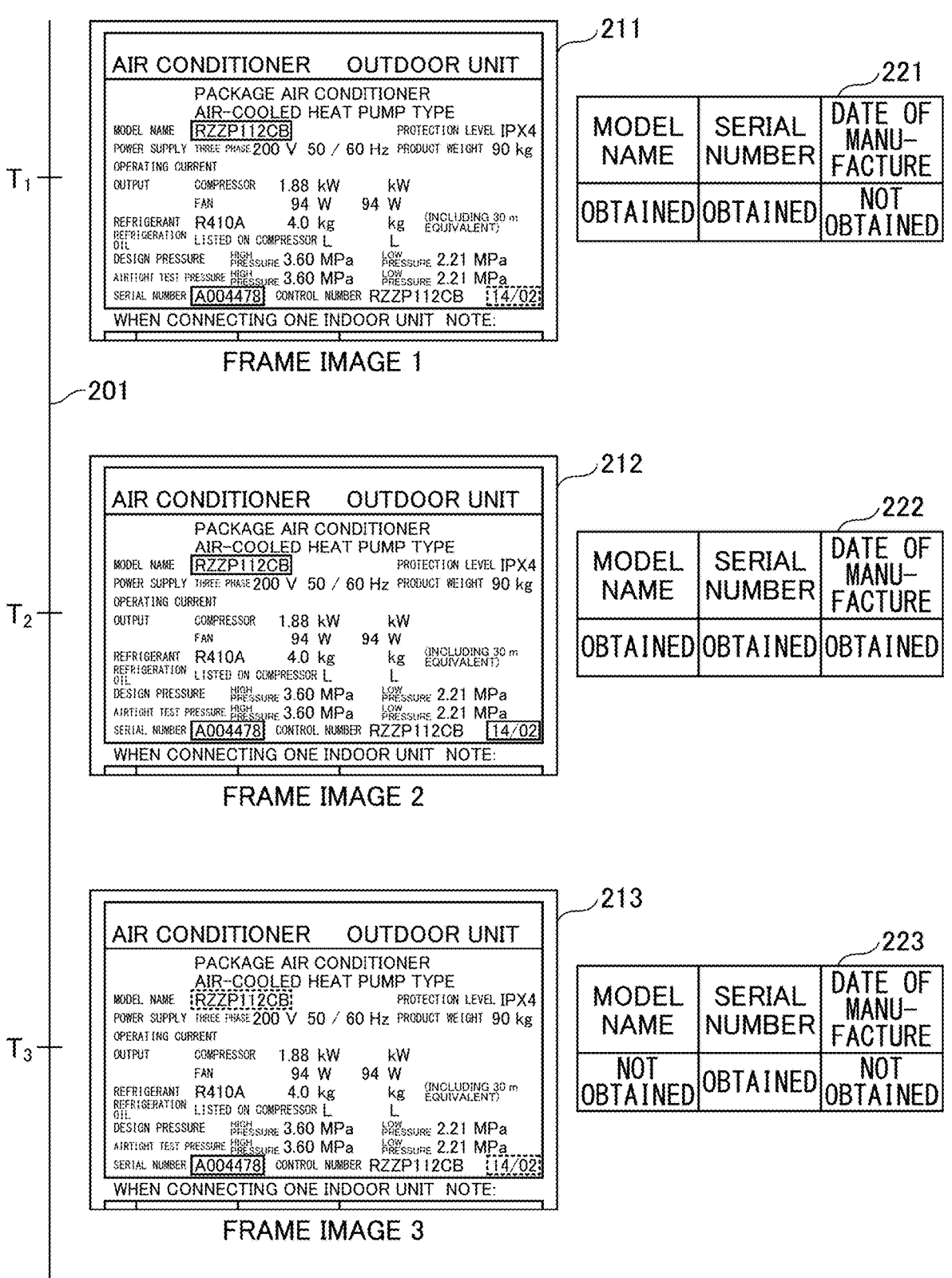
FIG. 2 is a diagram illustrating an example of character recognition results obtained by performing a 10 character recognition process on each frame image.

Each embodiment will be described below with reference to the attached drawings. In the present specification and the drawings, components having substantially the same functional configuration will be denoted by the same reference numerals and thus duplicate descriptions will be omitted.

First Embodiment

<Application Example of Information Terminal>

First, an application example of an information terminal according to a first embodiment will be described. FIG. 1 is a diagram illustrating an application example of the information terminal. As illustrated on the left side of FIG. 1, an information terminal 120 is used, for example, in a scenario in which equipment data is read from an equipment nameplate 111 attached to the side of the on-site equipment 110.

According to the information terminal 120, for example, when a maintenance worker 130 conducts an on-site inspection and registers the inspection result in a server device (not illustrated), it is possible to save the maintenance worker 130 the trouble of manually inputting equipment data for specifying the on-site equipment 110 to be inspected. Moreover, it is possible to prevent the maintenance worker 130 from erroneously inputting equipment data.

In the present embodiment, it is assumed that the on-site equipment 110 is an outdoor unit of an air conditioner and the information terminal 120 is a portable terminal. However, the on-site equipment 110 is not limited to an outdoor unit of an air conditioner and may be a unit other than an outdoor unit of an air conditioner. The on-site equipment 110 may be on-site equipment other than an air conditioner. The information terminal 120 is not limited to a portable terminal and may be an information terminal other than a portable terminal as long as it has an optical character recognition function.

The right side of FIG. 1 illustrates a state in which the maintenance worker 130 captures images of the equipment nameplate 111, and a captured image 121 is displayed on a display screen of the information terminal 120. As illustrated on the right side of FIG. 1, the captured image 121 includes an image area 122 corresponding to the equipment nameplate 111.

When the on-site equipment 110 is an outdoor unit of an air conditioner, the equipment nameplate 111 displayed in the image area 122 includes, for example:

a description indicating that it is an outdoor unit;

a description indicating that it is an outdoor unit that serves both cooling and heating;

a description of the model (label; model code data);

a description of the serial number (label; serial number data);

a description of the product mass (label; mass data);

a description of the power supply specifications (label; phase data, voltage data, and frequency data);

a description of the compressor motor output (label; power consumption data), a description of the control number (label; control code data), a description of the quantity and type of refrigerant (label; coolant amount data, coolant type code), a description of the design pressure (label; pressure data), a description of the date of manufacture (label; date of manufacture data);

and the like (in FIG. 1, abbreviated as "*"). The actual description on the equipment nameplate 111 includes many characters such as alphabets, numbers, symbols, and Chinese characters (the language of the country where the on-site equipment 110 is installed).

In the present embodiment, when capturing images of the on-site equipment 110 using the information terminal 120, the data is obtained as moving image data from the time the maintenance worker 130 starts image capturing until the shutter operation is performed. In the present embodiment, a character recognition process is performed on each frame image included in the moving image data.

<Example of Character Recognition Process>

Next, character recognition results in the case where the maintenance worker 130 captures images of the on-site equipment 110 to obtain moving image data and the information terminal 120 performs character recognition process on each frame image will be described. FIG. 2 is a diagram illustrating an example of character recognition results obtained by performing a character recognition process on each frame image.

In FIG. 2, a vertical axis 201 represents the time axis, and the example of FIG. 2 illustrates frame images (reference numeral 211 to 213) taken at time $T_1$, $T_2$, and $T_3$ among the frame images included in the moving image data.

The example of FIG. 2 illustrates a state in which a character recognition process on each frame image included in the moving image data is performed, and character recognition results for the model name, the serial number, and the date of manufacture of the on-site equipment 110 are acquired as equipment data (reference numeral 221 to 223).

Specifically, in the example of FIG. 2, in the case of a frame image 1 taken at time $T_1$, character recognition results for the model name and the serial number are obtained by performing the character recognition process. On the other hand, a character recognition result for the date of manufacture is not obtained by performing the character recognition process.

In the example of FIG. 2, in the case of a frame image 2 taken at time $T_2$, character recognition results are obtained for the model name, the serial number, and the date of manufacture by performing the character recognition process, and the equipment data is obtained.

Furthermore, in the example of FIG. 2, in the case of a frame image 3 taken at time $T_3$, a character recognition result for the serial number is obtained by performing the character recognition process. On the other hand, character recognition results for the model name and the date of manufacture are not obtained by performing the character recognition process.

As described above, when images of the on-site equipment 110 are captured to obtain moving image data, there are cases in which character recognition results can be obtained and cases in which character recognition results cannot be obtained depending on slight differences in image capturing conditions during image capturing that the maintenance worker 130 does not notice.

In other words, it is not highly possible to obtain character recognition results for all of the plurality of target items (plural items to be recognized) at the timing of the shutter operation. Therefore, the information terminal 120 according to the present embodiment performs a character recognition process for frame images that have been taken before the shutter operation is performed. Then, in the information terminal 120 according to the present embodiment, when the character recognition results for all of the target items are obtained in any frame image, the data is acquired as the equipment data.

Thus, compared with the case where the character recognition process is performed only for the frame image obtained at the timing of the shutter operation, the possibility of acquiring the equipment data can be increased. As a result, according to the information terminal 120 according to the present embodiment, a workload of the maintenance worker when acquiring the equipment data of the on-site equipment by image capturing can be reduced.

<Hardware Configuration of Information Terminal>

Figure 3:
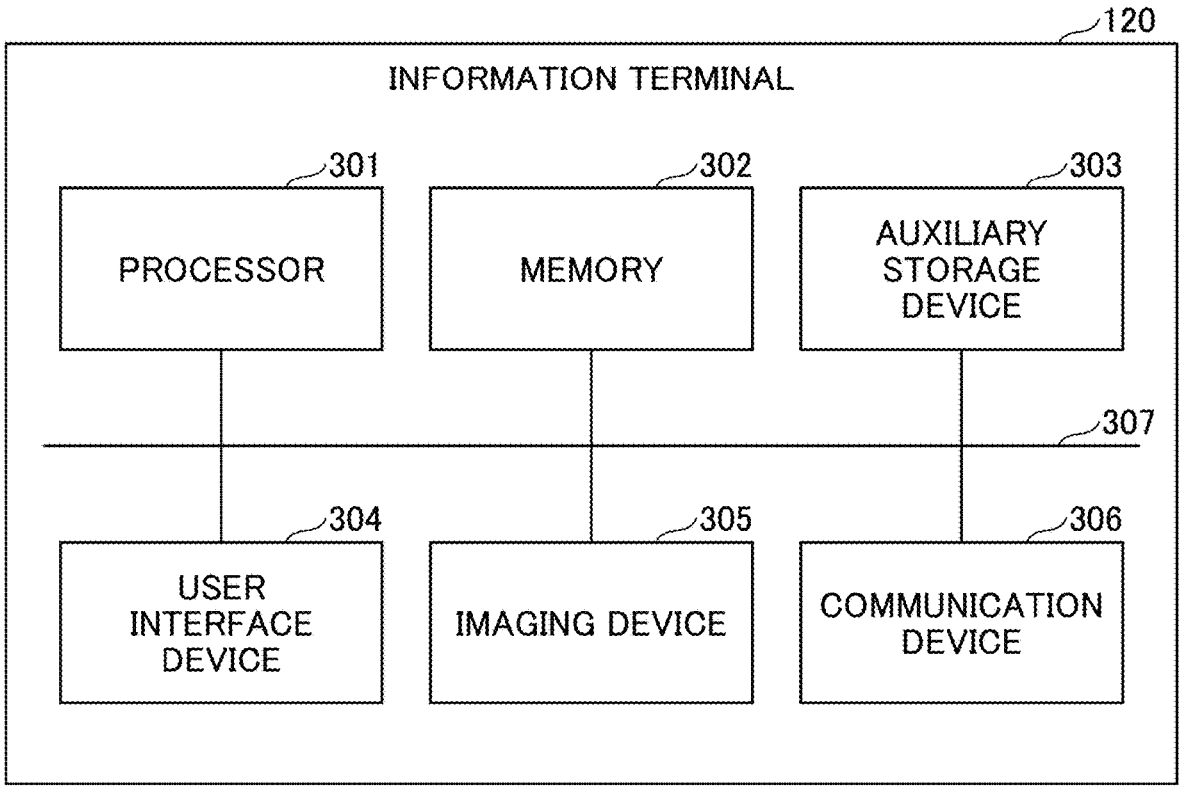
FIG. 3 is a diagram illustrating an example of a hardware configuration of an information terminal.

Next, a hardware configuration of the information terminal 120 will be described. FIG. 3 is a diagram illustrating an example of the hardware configuration of the information terminal. As illustrated in FIG. 3, the information terminal 120 includes a processor 301, a memory 302, an auxiliary storage device 303, a user interface device 304, an imaging device 305, and a communication device 306. The hardware of the information terminal 120 is connected to each other via a bus 307.

The processor 301 includes various computing devices such as a central processing unit (CPU), a graphics processing unit (GPU), a field programmable gate array (FPGA), an application specific integrated circuit (ASIC), or the like. The processor 301 reads and executes various programs (for example, a character recognition program described later) on the memory 302.

The memory 302 includes main storage devices such as a read only memory (ROM) and a random access memory (RAM). The processor 301 and the memory 302 form what is known as a computer. When the processor 301 executes various programs read on the memory 302, the computer realizes various functions.

The auxiliary storage device 303 stores various programs and various data (for example, frame images, libraries, correction tables, equipment data rules, character recognition results, and the like described later) used when the programs are executed by the processor 301.

The user interface device 304 has, for example, an operation function for the maintenance worker 130 to perform various operations and a display function for displaying the processing results of various processes executed by the information terminal 120.

The imaging device 305 captures images of the equipment nameplate 111 and generates a captured image 121. The communication device 306 is a communication device for communicating with external devices (for example, server devices not illustrated) via a network.

Various programs installed in the auxiliary storage device 303 are installed by downloading them from the network via the communication device 306, for example.

<Functional Configuration of Information Terminal>

Figure 4:
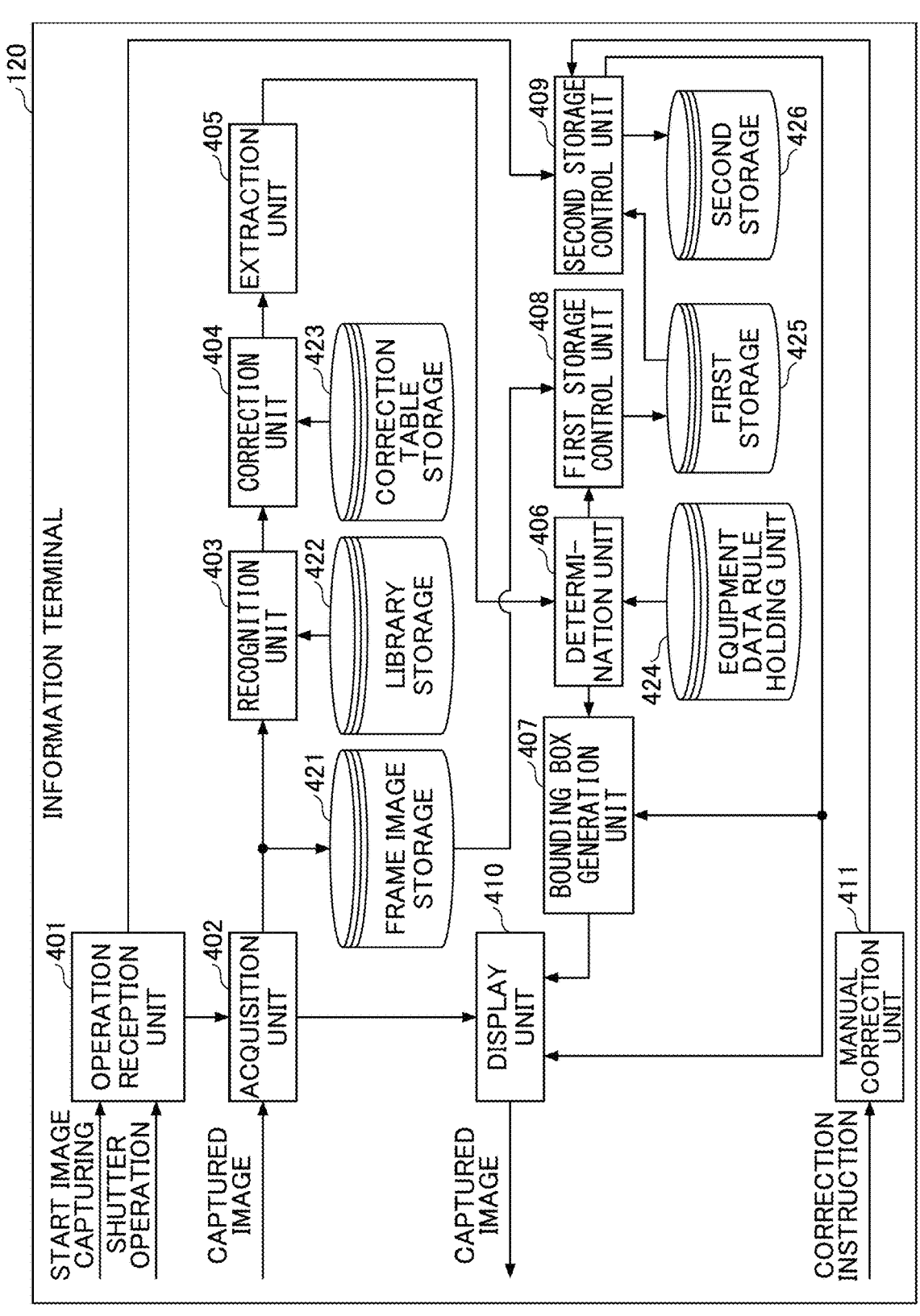
FIG. 4 is a first diagram illustrating an example of a functional configuration of an information terminal.

Next, the functional configuration of the information terminal 120 will be described. FIG. 4 is a first diagram illustrating an example of the functional configuration of the information terminal. As described above, a character recognition program is installed in the information terminal 120, and when the program is executed, the information terminal 120 functions as:

an operation reception unit 401;
an acquisition unit 402;
a recognition unit 403;
a correction unit 404;
an extraction unit 405;
a determination unit 406;
a bounding box generation unit 407;
a first storage control unit 408;
a second storage control unit 409;
a display unit 410; and
a manual correction unit 411.

The operation reception unit 401 receives an operation to start image capturing and a shutter operation among various operations of the maintenance worker 130 on the information terminal 120. When the operation reception unit 401 receives the operation to start image capturing, it notifies the acquisition unit 402 of an instruction to start image capturing.

When the shutter operation is received, the operation reception unit 401 notifies the acquisition unit 402 of an instruction to end image capturing and notifies the second storage control unit 409 that the shutter operation has been performed.

The acquisition unit 402 operates the imaging device 305 when the instruction to start image capturing is notified from the operation reception unit 401, and starts acquiring the captured image data obtained as a moving image in a predetermined frame period (an example of a predetermined period). The acquisition unit 402 notifies the display unit 410 of each frame image included in the acquired captured image data, decimates each frame image, and notifies the recognition unit 403. Furthermore, the acquisition unit 402 stores each frame image notified to the recognition unit 403 in the frame image storage unit 421. These processes performed by the acquisition unit 402 are repeatedly executed until an instruction to end image capturing is notified from the operation reception unit 401.

The recognition unit 403 performs a character recognition process with reference to a library storage unit 422 for each frame image notified from the acquisition unit 402, and notifies the correction unit 404 of the recognized characters. It is assumed that the library storage unit 422 stores a library for character recognition of alphabets, numbers, and symbols.

The correction unit 404 identifies a character misrecognized in the character recognition process among the characters notified from the recognition unit 403 while referring to the correction table storage unit 423, and corrects the identified character to the correct character. The correction unit 404 also notifies the extraction unit 405 of the corrected character. The correction table storage unit 423 stores a correction table in which characters that are easily misrecognized when the character recognition process is performed on a frame image included in captured image data obtained by capturing images of an equipment nameplate and characters when the characters are correctly recognized are associated with each other in advance.

The extraction unit 405 extracts a character string from the corrected characters notified by the correction unit 404, and notifies the determination unit 406 of the extracted character string together with its position and size. The extraction unit 405 extracts one line of the corrected characters as one character string. When a blank of a predetermined number of characters is included, one line is determined by performing a linefeed. However, in the present embodiment, the extraction unit 405 does not perform a linefeed when there is a blank after a number.

The determination unit 406 determines whether the character string notified by the extraction unit 405 is written in accordance with a naming rule of the target item (in the present embodiment, the model name, the serial number, and the date of manufacture are items to be recognized) (whether or not the storage conditions are satisfied). An equipment data rule holding unit 424 holds a naming rule that determines the character type, number of characters, and order of characters constituting the character string of the target item. The determination unit 406 determines whether the character string is written in accordance with the naming rule of the target item by referring to the equipment data rule holding unit 424.

Further, when it is determined that the character string is written in accordance with the naming rule of the target item as a result of the determination, the determination unit 406 notifies the bounding box generation unit 407 of the following:

the character string (the character recognition result) determined to be written in accordance with the naming rule, among the character strings notified by the extraction unit 405; and the position and size of the character string In addition, when it is determined that all the target items are determined to be written in accordance with the corresponding naming rule as a result of the determination, the determination unit 406 notifies the first storage control unit 408 of each character string (the character recognition result) written in accordance with the corresponding naming rule in association with each target item. Furthermore, the determination unit 406 notifies the first storage control unit 408 of the position and size notified by the extraction unit 405 in association with each target item.

The bounding box generation unit 407 generates a bounding box (information indicating the position and size of the character string) based on the position and size of the character string notified by the determination unit 406. The bounding box generation unit 407 also notifies the display unit 410 of the generated bounding box together with the character string (the character recognition result) notified by the determination unit 406.

When the determination unit 406 notifies the character recognition results of all the target items, the first storage control unit 408 stores them in a first storage 425 in association with the target items as the equipment data, together with their positions and sizes. When the determination unit 406 notifies the character recognition results of all the target items, the first storage control unit 408 reads the corresponding frame image from the frame image storage unit 421 and stores it in the first storage 425.

When a character recognition result of the target item is already stored in the first storage 425 together with the corresponding position, size, and a frame image, the first storage control unit 408 overwrites them. Thus, among the character recognition results of all the target items repeatedly notified during image capturing, the most recent character recognition results are stored in the first storage 425 together with the corresponding positions, sizes, and frame images.

When the operation reception unit 401 notifies the shutter operation, the second storage control unit 409 reads the most recent character recognition results and the corresponding positions, sizes, and frame images from the first storage 425 and stores them in a second storage 426. Thus, the second storage control unit 409 can store the finalized character recognition results and the like in the second storage 426. In other words, in the present embodiment, the shutter operation can be said to be an operation for finalizing the character recognition results and the like.

The second storage control unit 409 notifies the bounding box generation unit 407 of the finalized character recognition result, and position and size. The second storage control unit 409 also notifies the display unit 410 of the finalized frame image.

In response to the notification of the finalized character recognition result, position and size, and frame image, the second storage control unit 409 receives the corrected character string obtained by manually correcting the character recognition result from the manual correction unit 411. The second storage control unit 409 stores the received corrected character string in the second storage 426 by overwriting.

The display unit 410 displays each frame image notified by the acquisition unit 402 at a predetermined frame period on the user interface device 304. When displaying each frame image notified by the predetermined frame period, the display unit 410 superimposes the bounding box and the character recognition result notified by the bounding box generation unit 407. The bounding box and the character recognition result superimposed on each frame image by the display unit 410 are updated at a period longer than the predetermined frame period. This is because, as described above, the acquisition unit 402 decimates each frame image and notifies the recognition unit 403 of the decimated frame image, so that the period in which the bounding box is generated becomes longer than the predetermined frame period.

The display unit 410 superimposes the bounding box and the character recognition result notified from the bounding box generation unit 407 on the frame image notified from the second storage control unit 409 when the shutter operation is performed. Furthermore, the display unit 410 displays the frame image superimposed with the bounding box and the character recognition result on the user interface device 304.

In other words, the display unit 410 displays the frame image in real time during image capturing, updates the bounding box and the character recognition result superimposed on the target item at a period longer than a predetermined frame period, and displays, when the shutter operation is performed, the finalized frame image, the bounding box generated based on the finalized position and size, and the finalized character recognition result.

The manual correction unit 411 receives the manual correction instruction when the manual correction instruction is input in response to the display unit 410 displaying the finalized character recognition result and the finalized frame image due to the shutter operation. The manual correction unit 411 notifies the second storage control unit 409 of the manually corrected character string.

<Operation Example of Entire Information Terminal>

Figure 5:
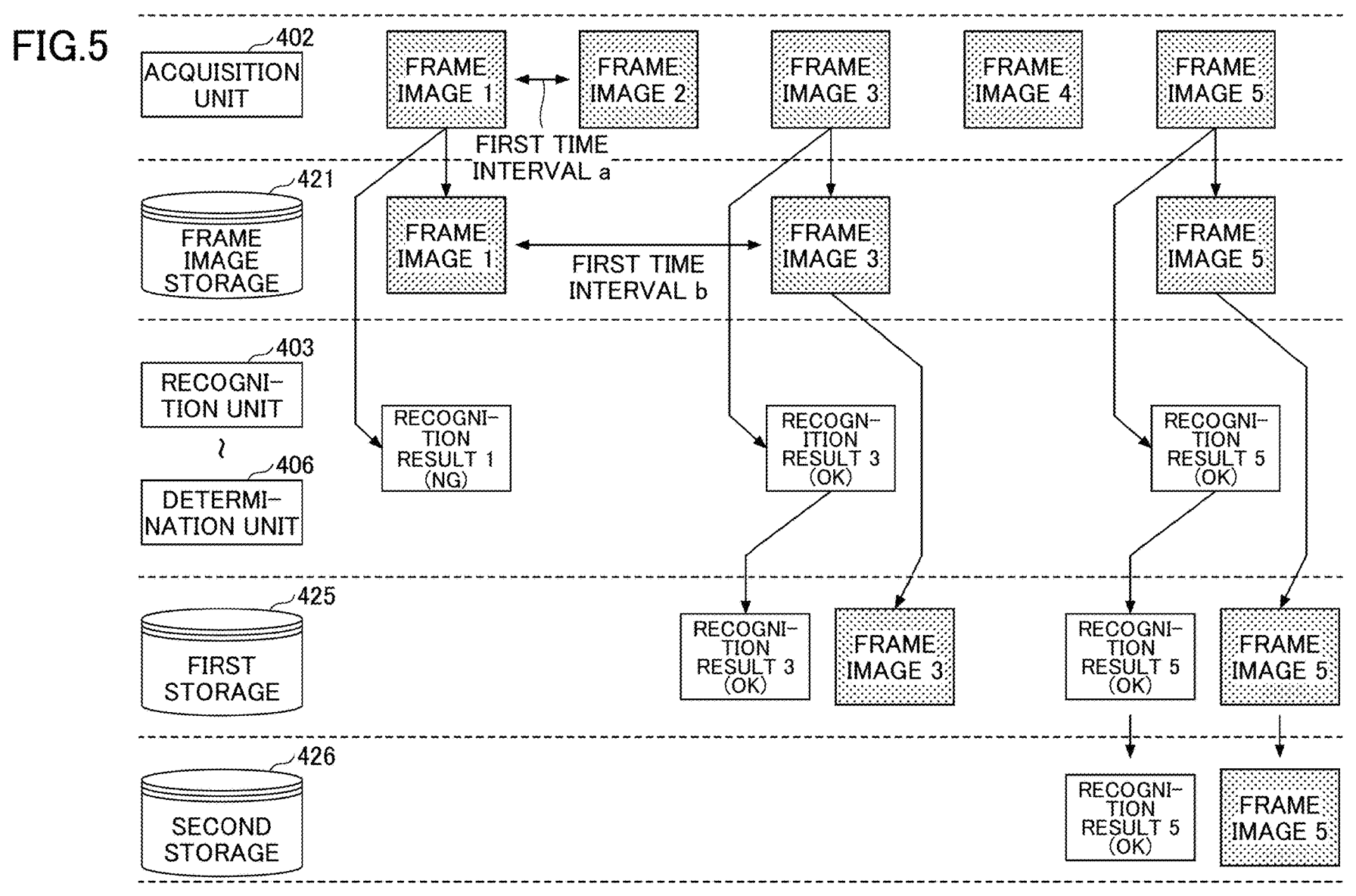

Next, an operation example of the entire information terminal 120 will be described. FIG. 5 is a diagram illustrating an operation example of the entire information terminal.

In FIG. 5, "frame image 1" to "frame image 5" indicate frame images acquired by the acquisition unit 402. Specifically, "frame image 1" is acquired upon input of the instruction to start image capturing, and the shutter operation is performed immediately after capturing an image of "frame image 5".

The example of FIG. 5 illustrates how "frame image 1", "frame image 3", and "frame image 5" are stored in frame image storage unit 421.

According to the example of FIG. 5, the frame image displayed on the user interface device 304 of the information terminal 120 is updated at a first time interval a. Furthermore, the bounding box and the character recognition result displayed superimposed on the frame image on the user interface device 304 of the information terminal 120 are updated at least at a second time interval b (a<b).

In FIG. 5, "recognition result 1 (NG (Not Good))" indicates a state in which each unit of the recognition unit 403 to the determination unit 406 executes the process on "frame image 1", and it is determined that any of the character strings included in "frame image 1" is not written in accordance with the naming rule of the target item. In this case, "recognition result 1 (NG)" and "frame image 1" are not stored in the first storage 425.

On the other hand, in FIG. 5, "recognition result 3 (OK)" indicates a state in which each unit of the recognition unit 403 to the determination unit 406 executes the process on "frame image 3", and it is determined that the character strings included in "frame image 3" are written in accordance with the naming rules of the target items. In this case, "recognition result 3 (OK)" (the character recognition result) and "frame image 3" are stored in the first storage 425 (in the example of FIG. 5, the position and size are omitted).

In FIG. 5, "recognition result 5 (OK)" indicates a state in which each unit of the recognition unit 403 to the determination unit 406 executes the process on "frame image 5", and it is determined that the character strings included in "frame image 5" are written in accordance with the naming rules of the target items. In this case, "recognition result 5 (OK)" (the character recognition result) and "frame image 5" are stored in the first storage 425 by overwriting.

The example of FIG. 5 illustrates a state in which "recognition result 5 (OK)" (the character recognition result) and "frame image 5" stored in the first storage 425 are stored in the second storage 426 at the time when the shutter operation is performed.

<Details of Process of Each Functional Unit of Information Terminal>

Next, details of process of each functional unit (here, the recognition unit 403, the correction unit 404, the extraction unit 405, the determination unit 406, the first storage control unit 408, and the second storage control unit 409) of the information terminal will be described.

(1) Details of Processes of Recognition Unit 403 to Extraction Unit 405

First, details of the processes of the recognition unit 403 to the extraction unit 405 will be described. FIG. 6 illustrates a specific example of the processes of the recognition unit to the extraction unit.

As described above, the library storage unit 422 stores a library for character recognition of alphabets, numbers, and symbols. Therefore, when the character recognition process is performed on a frame image, and when alphabets, numbers, and symbols are included in the frame image, the recognition unit 403 performs character recognition of alphabets, numbers, and symbols in the frame image. When a character other than alphabets, numbers, and symbols are included in the frame image, the recognition unit 403 recognizes the character as one of alphabets, numbers, and symbols. Specifically, when a character other than alphabets, numbers, and symbols is included in the frame image, the recognition unit 403 recognizes the character as an alphabet, number, or symbol similar to the character.

In FIG. 6, a reference numeral 610 indicates characters obtained by the recognition unit 403 performing the character recognition process on the frame image.

Subsequently, the correction unit 404 determines a misrecognized character from the characters indicated by the reference numeral 610. Specifically, when the characters indicated by the reference numeral 610 includes alphabets, numbers, and symbols that are not used as the target items, the correction unit 404 determines that the alphabets, numbers, and symbols are misrecognized and corrects them.

As described above, the correction unit 404 corrects the alphabets, numbers, and symbols determined to be misrecognized while referring to the correction table (an example of a character correction rule, for example, a correction table 600) stored in the correction table storage unit 423. As described above, in the correction table 600, characters that are easily misrecognized (pre-correction characters) and characters that are correctly recognized (post-correction characters) are associated with each other in advance. In FIG. 6, a reference numeral 620 indicates the corrected character in which the misrecognized character is corrected among the characters indicated by the reference numeral 610 (due to space limitations, the reference numeral 620 indicates a state in which a linefeed is inserted to extract one line as a single character string).

Subsequently, the extraction unit 405 sequentially extracts one line of the characters indicated by the reference numeral 620 as a single character string and notifies the determination unit 406. In FIG. 6, a reference numeral 630 indicates a state in which "ARR63UP" is extracted as a character string from the characters indicated by the reference numeral 620.

Furthermore, the extraction unit 405 sequentially calculates the position and size of the extracted character string in the frame image before the linefeed, and notifies the determination unit 406 together with the extracted character string (the reference numeral 630). In FIG. 6, the reference numeral 631 indicates a state in which the position and size of the extracted character string (the reference numeral 630) in the frame image before the linefeed are calculated.

(2) Details of Process of Determination Unit 406

Figure 7:
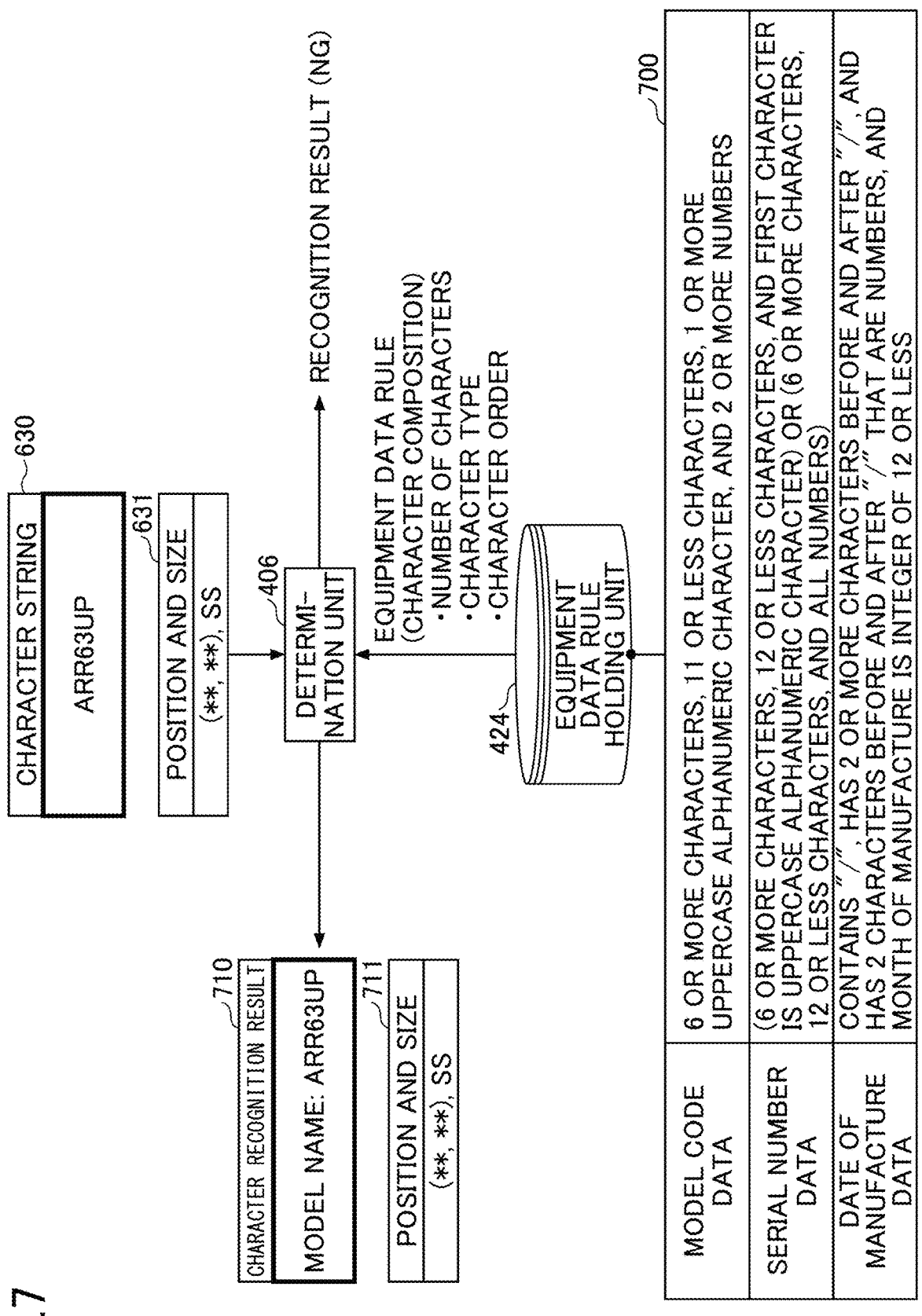
FIG. 7 is a diagram illustrating a specific example of processing by a determination unit.

Next, details of the process of the determination unit 406 will be described. FIG. 7 illustrates a specific example of the process of the determination unit.

As described above, the equipment data rule holding unit 424 holds a naming rule 700 of the target item. By referring to the naming rule 700 held in the equipment data rule holding unit 424, the determination unit 406 determines whether the character string (see the reference numeral 630) sequentially notified from the extraction unit 405 is written in accordance with the naming rule of the target item.

The example illustrated in FIG. 7 illustrates a state in which the character string indicated by the reference numeral 630 is notified and the determination unit 406 refers to the determination criteria determined based on the naming rule of "model code data" in the naming rule 700. The determination unit 406 determines that because the character string "ARR63UP" indicated by the reference numeral 630 meets the determination criteria, the character string is written in accordance with the naming rule of "model code data".

Therefore, the determination unit 406 notifies the bounding box generation unit 407 (not illustrated in FIG. 7) of the character string of the "model name" (the character recognition result) and the position and size of the character string (see reference numerals 710 and 711).

In the example illustrated in FIG. 7, it is assumed that, among the character strings sequentially notified to the determination unit 406, there is a character string that meets the determination criteria determined based on the naming rule of "model code data" in the naming rule 700;

there is no character string that meets the determination criteria determined based on the naming rule of "serial number data" in the naming rule 700; and there is no character string that meets the determination criteria determined based on the naming rule of "date of manufacture data" in the naming rule 700.

Therefore, the determination unit 406 notifies the first storage control unit 408 of the recognition result (NG).

In contrast, although not illustrated in the example of FIG. 7, it is assumed that, among the character strings sequentially notified to the determination unit 406, there is a character string that meets the determination criteria determined based on the naming rule of "model code data" in the naming rule 700;

there is a character string that meets the determination criteria determined based on the naming rule of "serial number data" in the naming rule 700; and there is a character string that meets the determination criteria determined based on the naming rule of "date of manufacture data" in the naming rule 700.

In this case, the determination unit 406 notifies the first storage control unit 408 of:

the character recognition results (the recognition result (OK)) for all the target items; and the positions and sizes of the character string of "model name" (the character recognition result), the character string of "serial number" (the character recognition result), and the character string of "date of manufacture" (the character recognition result).

(3) Details of Process of First Storage Control Unit 408

Figure 8:
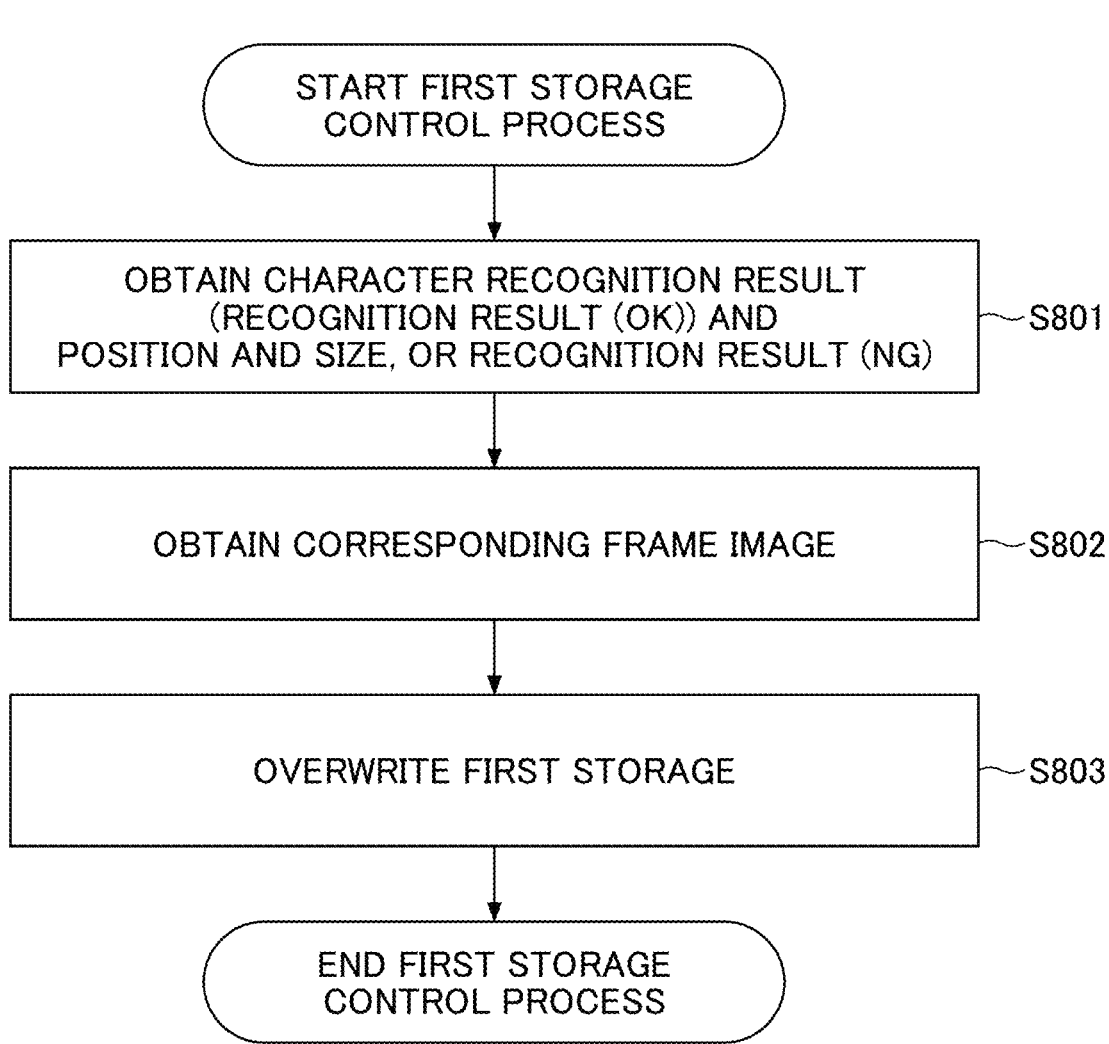
FIG. 8 is a flowchart illustrating a process flow by a first storage control unit.

Next, details of the process of the first storage control unit 408 will be described. FIG. 8 is a flowchart illustrating a process flow by the first storage control unit.

As illustrated in FIG. 8, in step S801, the first storage control unit 408 obtains the character recognition result (the recognition result (OK)) and its position and size or the recognition result (NG) from the determination unit 406.

In step S802, the first storage control unit 408 refers to the frame image storage unit 421 and acquires the frame image corresponding to the obtained character recognition result.

In step S803, when the character recognition result (the recognition result (OK)) and its position and size are obtained, the first storage control unit 408 associates the obtained character recognition result with the target item and stores them in the first storage 425 as the equipment data. The first storage control unit 408 associates the obtained position and size with the target item and stores them in the first storage 425. Furthermore, the first storage control unit 408 associates the obtained frame image with the obtained character recognition result and stores them in the first storage 425.

When the character recognition result, the position and size, and the frame image are already stored in the first storage 425, the first storage control unit 408 overwrites them.

(4) Details of Process of Second Storage Control Unit 409

Figure 9:
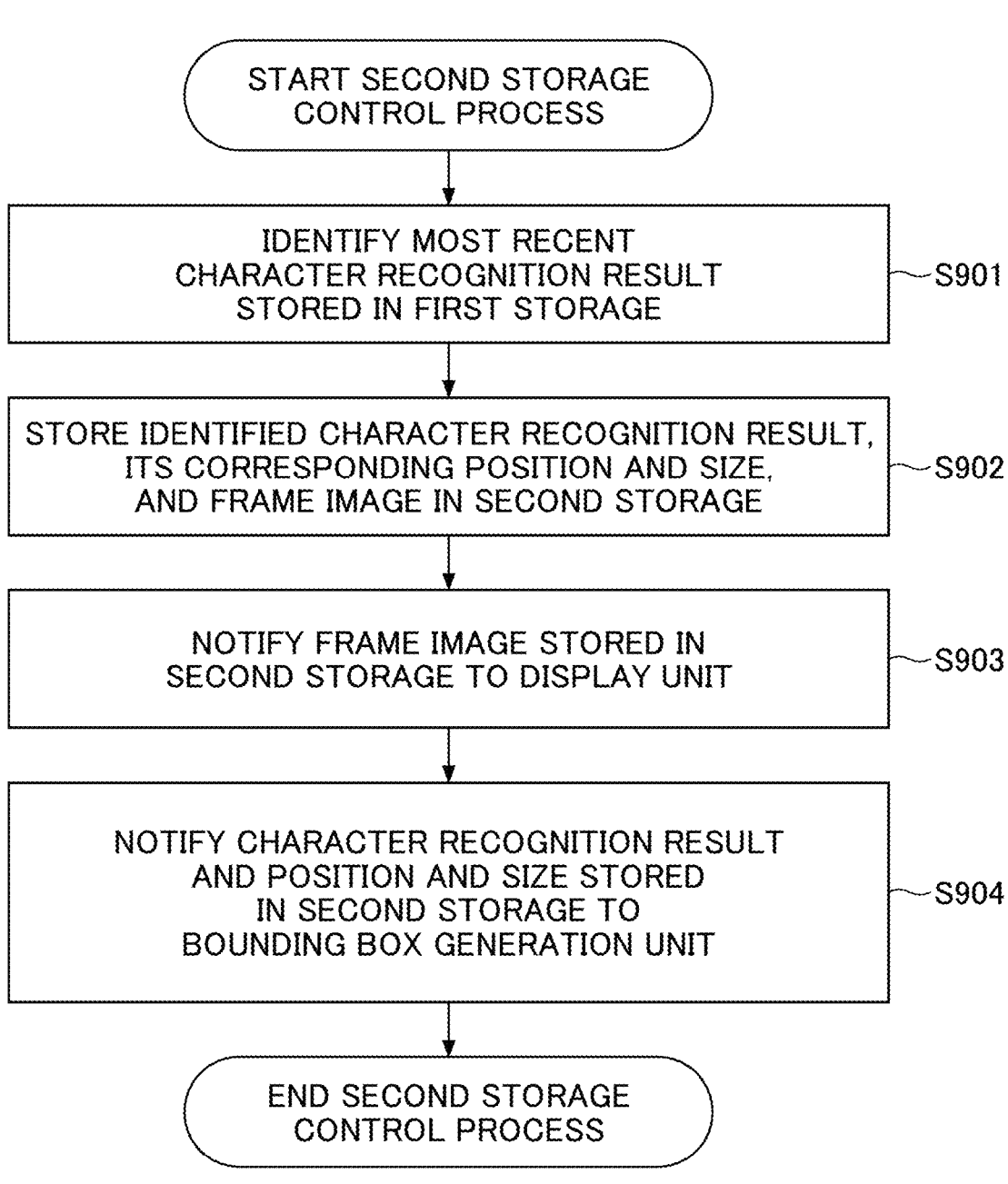
FIG. 9 is a flowchart illustrating a process flow by a second storage control unit.

Next, details of the process of the second storage control unit 409 will be described. FIG. 9 is a flowchart illustrating a process flow by the second storage control unit.

As illustrated in FIG. 9, in step S901, the second storage control unit 409 identifies the most recent character recognition result stored in the first storage 425 as the equipment data.

In step S902, the second storage control unit 409 reads the identified character recognition result, the corresponding position and size, and the corresponding frame image from the first storage 425 and stores them in the second storage 426 to finalize the character recognition result and the like.

In step S903, the second storage control unit 409 notifies the display unit 410 of the finalized frame image stored in the second storage 426.

In step S904, the second storage control unit 409 notifies the bounding box generation unit 407 of the finalized character recognition result, the position and size stored in the second storage 426.

<Display Example of Display Unit>

Figure 10A:
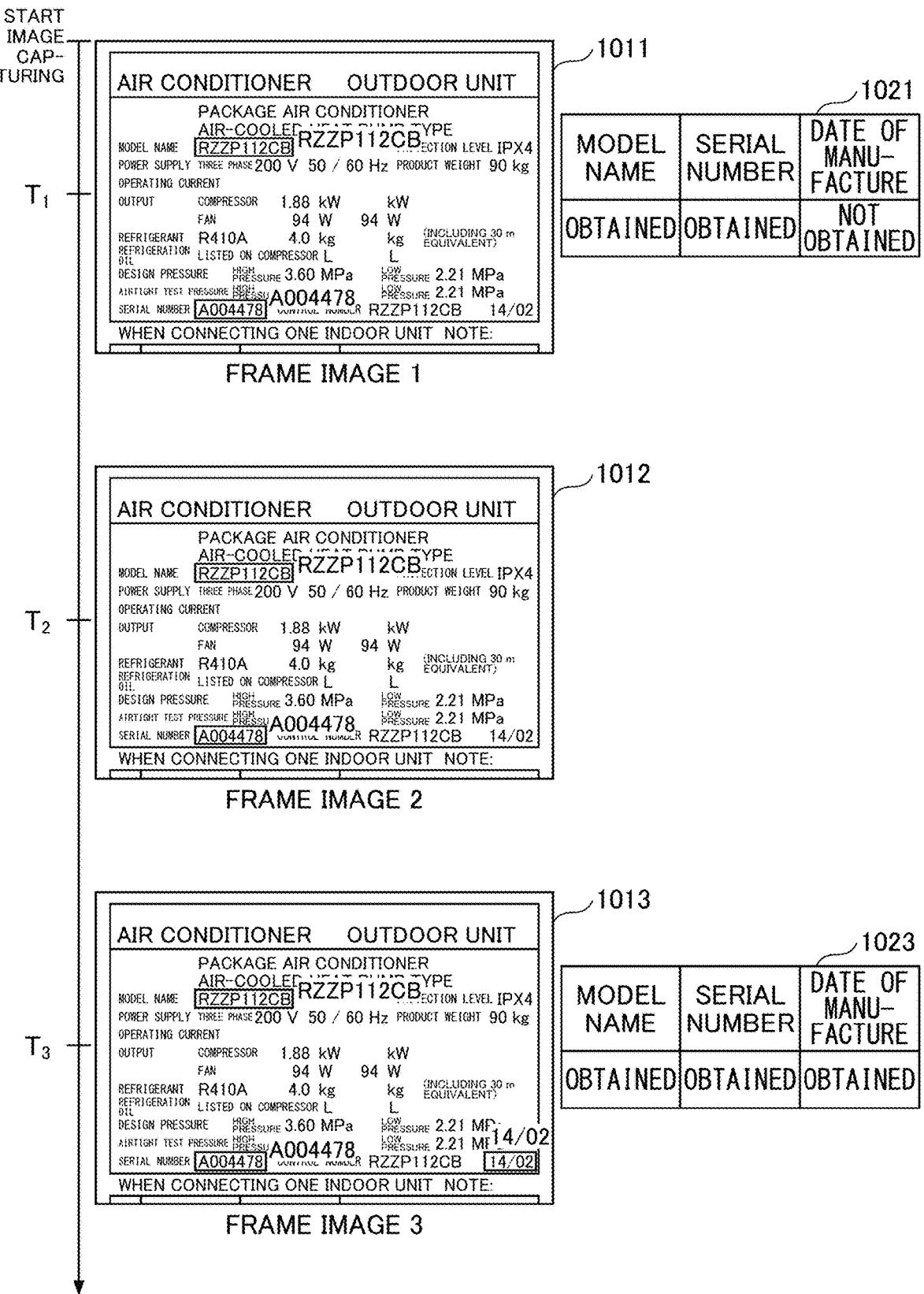
FIG. 10A is a first diagram illustrating a display example of frame images and bounding boxes displayed by a display unit.
Figure 10B:
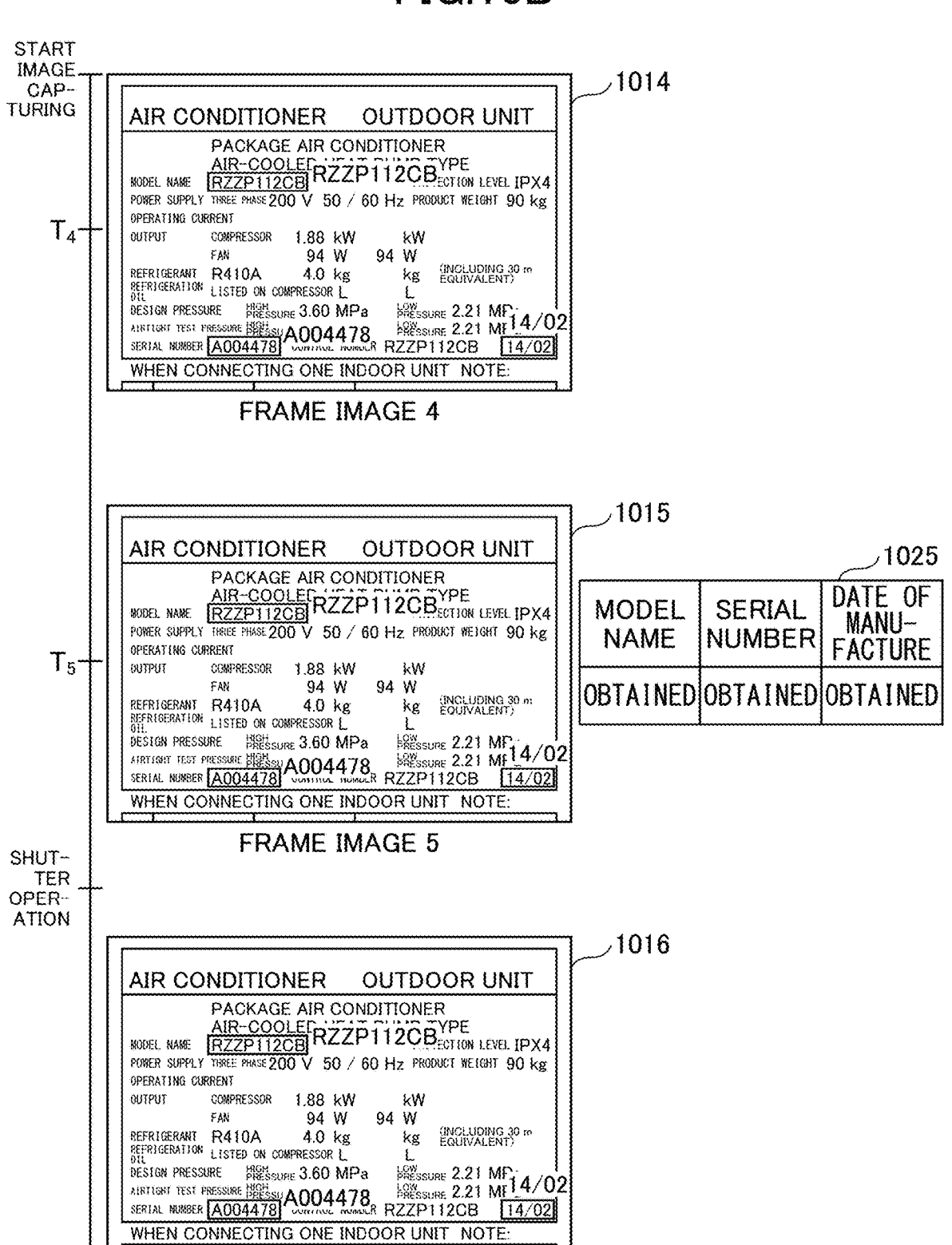
FIG. 10B is a second diagram illustrating a display example of frame images and bounding boxes displayed by the display unit.

Next, a display example of the frame image and the bounding box displayed on the display unit 410 will be described. FIGS. 10A and 10B are first and second diagrams illustrating display examples of the frame images and the bounding boxes displayed by the display unit.

The example of FIG. 10A illustrates a state in which a frame image 1 indicated by a reference numeral 1011 is displayed at time $T_1$ because the maintenance worker 130 performed the operation to start image capturing. Further, the example of FIG. 10A illustrates that in the character recognition process for the frame image 1, character recognition results are obtained for "model name" and "serial number", but a character recognition result is not obtained for "date of manufacture" (see a reference numeral 1021). Therefore, in the frame image 1, bounding boxes are displayed for the character strings of "model name" and "serial number", and character recognition results are displayed.

The example of FIG. 10A illustrates a state in which a frame image 2 indicated by a reference numeral 1012 is displayed at time $T_2$. Because the character recognition process is not performed for the frame image 2, the character recognition results obtained by performing the character recognition process for the frame image 1 are displayed as they are. In other words, in the frame image 2, the bounding boxes are displayed for the character strings of "model name" and "serial number", and the character recognition results are displayed.

The example of FIG. 10A illustrates a state in which a frame image 3 indicated by a reference numeral 1013 is displayed at time $T_3$. In the character recognition process for the frame image 3, the character recognition results are obtained for "model name", "serial number", and "date of manufacture" (see a reference numeral 1023). Therefore, in the frame image 3, bounding boxes are displayed for the character strings of "model name", "serial number", and "date of manufacture", and the character recognition results are displayed.

Subsequently, the example of FIG. 10B illustrates a state in which a frame image 4 indicated by a reference numeral 1014 is displayed at time $T_4$. Because the character recognition process is not performed for the frame image 4, the character recognition results obtained by performing the character recognition process for the frame image 3 are displayed as they are. In other words, in the frame image 4, the bounding boxes are displayed for the character strings of "model name", "serial number", and "date of manufacture", and the character recognition results are displayed.

The example of FIG. 10B illustrates a state in which a frame image 5 indicated by a reference numeral 1015 is displayed at time $T_5$. In the character recognition process for the frame image 5, the character recognition results are obtained for "model name", "serial number", and "date of manufacture" (see a reference numeral 1025). Therefore, in the frame image 5, bounding boxes are displayed in the character string of "model name", "serial number", and "date of manufacture", and the character recognition results are displayed.

Further, the example of FIG. 10B illustrates a state in which the maintenance worker 130 performs the shutter operation immediately after time $T_5$. At this point, as the most recent character recognition result, the character recognition results obtained by performing the character recognition process on the frame image 5 are stored in the first storage 425, and the frame image 5 is stored as the corresponding frame image. Then, the most recent character recognition results and the frame image 5 are stored in the second storage 426. Therefore, after the shutter operation is performed, the same frame image, bounding boxes, and character recognition results as the frame image, bounding boxes, and character recognition results displayed at time $T_5$ are displayed (a reference numeral 1016).

<Character Recognition Process>

Figure 11:
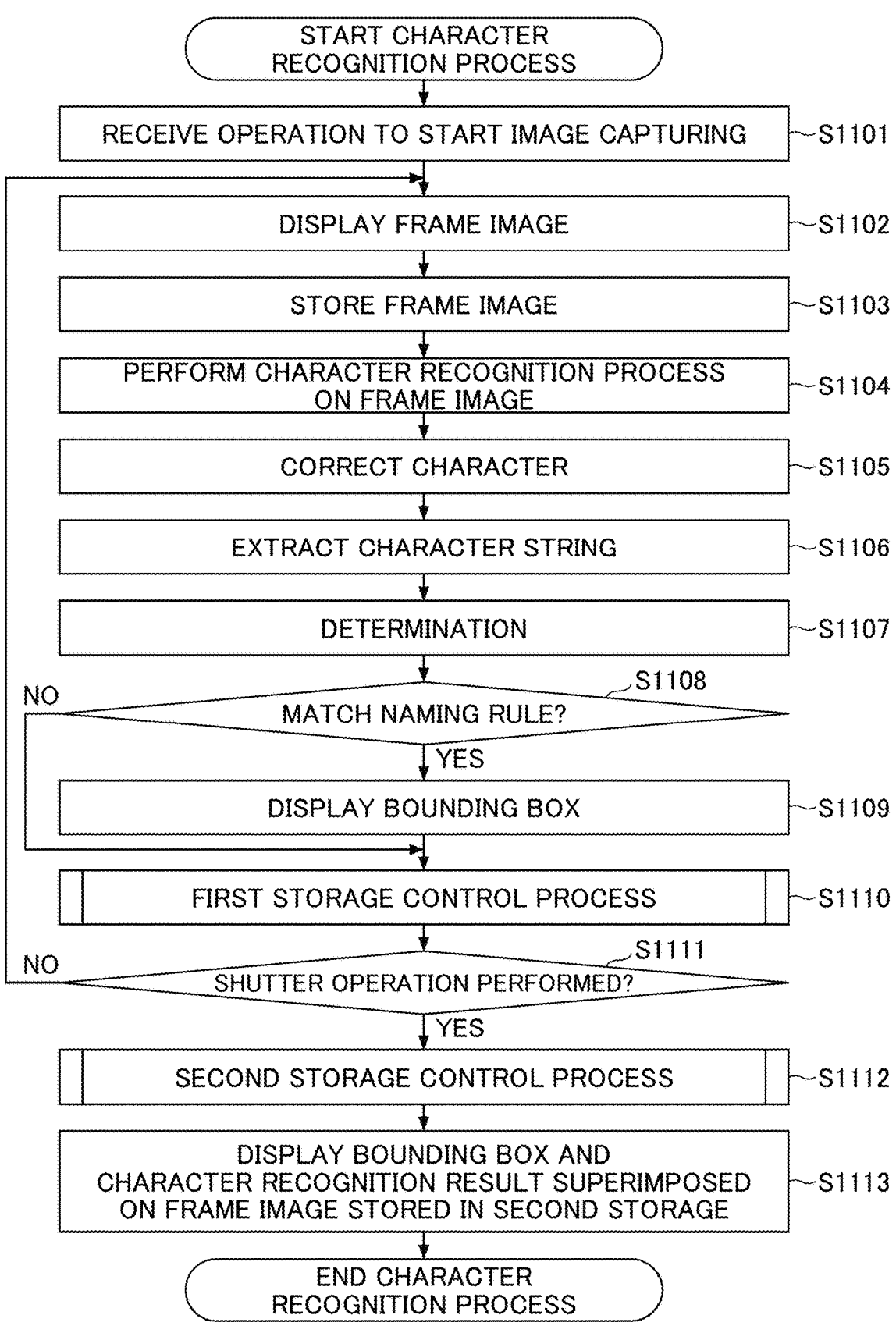
FIG. 11 is a flowchart illustrating a flow of the character recognition process by the information terminal.

Next, a flow of the character recognition process in the entire information terminal 120 will be described. FIG. 11 is a flowchart illustrating the flow of the character recognition process by the information terminal.

In step S1101, the information terminal 120 receives an operation to start image capturing by the maintenance worker 130.

In step S1102, the information terminal 120 starts capturing moving image data, acquires a frame image, and displays the acquired frame image.

In step S1103, the information terminal 120 decimates the acquired frame image and stores it in the frame image storage unit 421.

In step S1104, the information terminal 120 decimates the acquired frame image and performs a character recognition process.

In step S1105, the information terminal 120 corrects a character recognized by performing the character recognition process.

In step S1106, the information terminal 120 extracts a character string from the corrected characters.

In step S1107, the information terminal 120 determines whether the extracted character string is written in accordance with the naming rule of the target item.

When the information terminal 120 determines in step S1108 that the character string is not written in accordance with the naming rule (when NO in step S1108), the process proceeds to step S1110.

When the information terminal 120 determines in step S1108 that the character string is written in accordance with the naming rule (when YES in step S1108), the process proceeds to step S1109.

In step S1109, the information terminal 120 displays the character string (the character recognition result) determined to be written in accordance with the naming rule together with a bounding box.

In step S1110, the information terminal 120 performs a first storage control process. Because the details of the first storage control process have already been described with reference to FIG. 8, description thereof is omitted here.

In step S1111, the information terminal 120 determines whether there has been a shutter operation. When it is determined in step S1111 that there has been no shutter operation (when NO in step S1111), the process returns to step S1102.

When it is determined in step S1111 that there has been a shutter operation (when YES in step S1111), the process proceeds to step S1112.

In step S1112, the information terminal 120 performs a second storage control process. Because the details of the second storage control process have already been described with reference to FIG. 9, the description will be omitted here.

In step S1113, the information terminal 120 displays the finalized character recognition result superimposed on the finalized frame image together with the bounding box.

SUMMARY

As is clear from the above description, the information terminal 120 according to the first embodiment repeats the process of acquiring each frame image included in the captured moving image data and the process of storing the character recognition result obtained by performing the character recognition process on the frame image in the first storage; and finalizes the character recognition result when the shutter operation by the maintenance worker is received.

In this manner, the character recognition process is performed on each frame image during capturing the moving image data, and the correctly acquired character recognition result is finalized when the shutter operation is performed. Thus, according to the first embodiment, the maintenance worker does not need to redo the image capturing to acquire the equipment data.

As a result, according to the first embodiment, a workload of the worker in acquiring the equipment data of the on-site equipment by image capturing can be reduced.

Second Embodiment

In the first embodiment, the maintenance worker can perform the shutter operation regardless of whether the equipment data has been correctly acquired during capturing the moving image data. However, it may be configured such that the maintenance worker cannot perform the shutter operation until the equipment data is correctly acquired. Hereinafter, the second embodiment will be described focusing on the differences from the first embodiment.

<Functional Configuration of Information Terminal>

Figure 12:
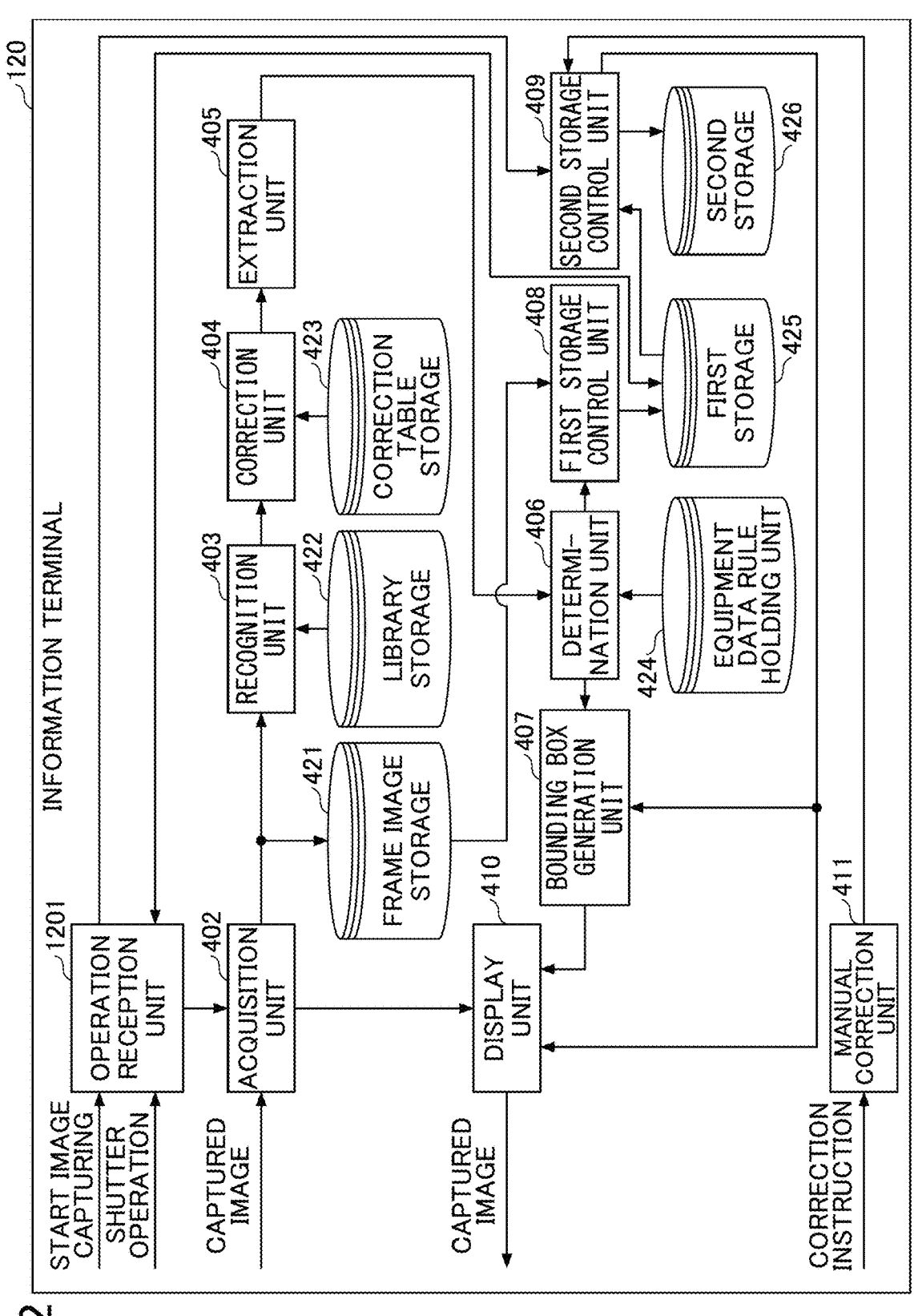
FIG. 12 is a second diagram illustrating an example of a functional configuration of the information terminal.

FIG. 12 is a second diagram illustrating an example of a functional configuration of the information terminal. The difference from the functional configuration of the information terminal 120 according to the first embodiment described with reference to FIG. 4 is that the function of an operation reception unit 1201 is different from that of the operation reception unit 401.

In the information terminal 120 according to the second embodiment, the operation reception unit 1201 receives the operation to start image capturing by the maintenance worker 130, notifies the acquisition unit 402 of the instruction to start image capturing, and starts monitoring of the first storage 425.

Specifically, the operation reception unit 1201 monitors whether the character recognition result for the target item (the model name, serial number, and date of manufacture) has been stored in the first storage 425. When it is determined that the character recognition result is not stored, the operation reception unit 1201 does not accept the shutter operation by the maintenance worker 130. When it is determined that the character recognition result has been stored, the operation reception unit 1201 accepts the shutter operation by the maintenance worker 130 and notifies the second storage control unit 409 that the shutter operation has been performed.

SUMMARY

As is clear from the above description, the information terminal 120 according to the second embodiment is configured such that the shutter operation cannot be performed until the equipment data is correctly acquired after the operation to start image capturing is performed.

Thus, according to the second embodiment, the maintenance worker can surely eliminate the need to redo the image capturing.

OTHER EMBODIMENTS

In the first and second embodiments, the case where the shutter operation is assigned as the operation for finalizing the character recognition result has been described, but an operation other than the shutter operation may be assigned to the operation for finalizing the character recognition result.

In the first and second embodiments, the capturing of the moving image data is terminated by performing the shutter operation, and the character recognition result is finalized. However, the termination of the capturing of the moving image data and the finalizing of the character recognition result may be automatically executed on the condition that the character recognition result for the target item is stored in the first storage 425.

In the first and second embodiments, when the character recognition results are obtained for all the target items, they are stored in the first storage 425. However, the method of storing in the first storage 425 is not limited thereto. For example, as in the first and second embodiments, when a plurality of target items are included and a character recognition result is obtained for any of the target items, the obtained character recognition result may be used for overwriting as the character recognition result of the corresponding target item. In other words, the character recognition result may be individually stored for each target item.

In the first and second embodiments, the case of reading the equipment data from the equipment nameplate has been described, but the object of reading the equipment data is not limited to the equipment nameplate. Alternatively, the object of reading from the equipment nameplate is not limited to the equipment data. Furthermore, the object captured by the imaging device is not limited to the equipment nameplate, but may be other than the equipment nameplate as long as it contains a specific character string.

In the first and second embodiments, the equipment data rule in the case where the on-site equipment is an outdoor unit of an air conditioner is exemplified, but when the on-site equipment is different, the equipment data rule corresponding to the different on-site equipment is used. Similarly, in the first and second embodiments, the label in the case where the on-site equipment is an outdoor unit of an air conditioner is exemplified, but when the on-site equipment is different, the label corresponding to the different on-site equipment is used.

In the first and second embodiments, for convenience of explanation, the character recognition result obtained from the frame image is superimposed on the displayed frame image. However, because it takes a certain amount of time to obtain and superimpose the character recognition result, the frame image from which the character recognition result is obtained and the frame image on which the obtained character recognition result is superimposed may not be identical.

Although the embodiments have been described above, it should be understood that various changes in the form and details can be made without departing from the spirit and scope of the claims.

EXPLANATION OF REFERENCES

110: On-site equipment
111: Equipment nameplate
120: Information terminal
121: Captured image
305: Imaging device
401: Operation reception unit
402: Acquisition unit
403: Recognition unit
404: Correction unit
405: Extraction unit
406: Determination unit
407: Bounding box generation unit
408: First storage control unit
409: Second storage control unit
410: Display unit
411: Manual correction unit
1201: Operation reception unit

What is claimed is:

1. An information terminal comprising:
a controller, wherein
the controller is configured to:
repeat a process of acquiring a frame image that has been captured and a process of storing a character recognition result in a storage, the character recognition result being obtained by performing character recognition of the frame image and being a character string that is determined to be written in accordance with a naming rule, thereby storing a plurality of character recognition results of a plurality of frame images in the storage; and when a predetermined operation to the information terminal to end capturing of the frame image is received, finalize, as a final character recognition result, (i) in a case where the character recognition result of the frame image that is last captured is obtained, the character recognition result of the frame image that is last captured among the plurality of frame images, and (ii) in a case where the character recognition result of the frame image that is last captured is not obtained, the character recognition result of the frame image that is captured earlier than the frame image that is last captured.

2. The information terminal according to claim 1, wherein when the frame image that has been captured is displayed in real time, the character recognition result obtained by the character recognition is superimposed and displayed.

3. The information terminal according to claim 2, wherein the controller is configured to:
update, at a first time interval, the frame image that is displayed; and
update, at a second time interval longer than the first time interval, the character recognition result that is superimposed and displayed.

4. The information terminal according to claim 1, wherein the controller is configured to:
when the frame image that has been captured includes a plurality of items, each of the plurality of items being to be stored as the character recognition result, store the character recognition result of each item obtained by the character recognition in the storage by each item; and
when the predetermined operation to the information terminal to end capturing of the frame image is received, finalize, by each item, as a final character recognition result, (i) in a case where the character recognition result of the frame image that is last captured is obtained, the character recognition result of the frame image that is last captured among the plurality of frame images, and (ii) in a case where the character recognition result of the frame image that is last captured is not obtained, the character recognition result of the frame image that is captured earlier than the frame image that is last captured.

5. The information terminal according to claim 1, wherein the controller is configured to store a corrected character recognition result in the storage when the final character recognition result that is displayed is corrected in response to a display unit displaying the final character recognition result.

6. The information terminal according to claim 1, wherein the controller is configured to perform the character recognition of the frame image in which a nameplate of equipment is captured and to obtain a model name and a serial number as the character recognition result.

7. The information terminal according to claim 1, wherein the controller is configured to:
store the plurality of character recognition results obtained by the character recognition in a first storage; and
store the final character recognition result in a second storage.

8. The information terminal according to claim 7, wherein the controller is configured to update the plurality of character recognition results stored in the first storage each time a character recognition result is obtained by performing the character recognition.

9. The information terminal according to claim 7, wherein the controller is configured to:

store, in the first storage, each of the plurality of frame images in association with a corresponding one of the plurality of character recognition results; and store, in the second storage, the frame image from which the final character recognition result is obtained in association with the final character recognition result.

10. A character recognition method, wherein a controller of an information terminal executes:

a step of repeating a process of acquiring a frame image that has been captured and a process of storing a character recognition result in a storage, the character recognition result being obtained by performing character recognition of the frame image and being a character string that is determined to be written in accordance with a naming rule, thereby storing a plurality of character recognition results of a plurality of frame images in the storage; and when a predetermined operation to the information terminal to end capturing of the frame image is received, a step of finalizing, as a final character recognition result, (i) in a case where the character recognition result of the frame image that is last captured is obtained, the character recognition result of the frame image that is last captured among the plurality of frame images, and (ii) in a case where the character recognition result of the frame image that is last captured is not obtained, the character recognition result of the frame image that is captured earlier than the frame image that is last captured.

11. A non-transitory computer-readable recording medium storing a character recognition program for causing a controller of an information terminal to execute:

a step of repeating a process of acquiring a frame image that has been captured and a process of storing a character recognition result in a storage, the character recognition result being obtained by performing character recognition of the frame image and being a character string that is determined to be written in accordance with a naming rule, thereby storing a plurality of character recognition results of a plurality of frame images in the storage; and when a predetermined operation to the information terminal to end capturing of the frame image is received, a step of finalizing, as a final character recognition result, (i) in a case where the character recognition result of the frame image that is last captured is obtained, the character recognition result of the frame image that is last captured among the plurality of frame images, and (ii) in a case where the character recognition result of the frame image that is last captured is not obtained, the character recognition result of the frame image that is captured earlier than the frame image that is last captured.

\* \* \* \* \*